Patented June 27, 1950

2,513,189

UNITED STATES PATENT OFFICE 2,513,189

PREPARATION OF POLYVINYL ACETALS

Elmore Louis Martin, Wilmington, Del., assignor to E. I. du Pont de Nemours & Company, Wilmington, Del., a corporation of Delaware No Drawing. Application January 18, 1947, Serial No. 722,961

10 Claims. (Cl. 260—73)

This invention relates to the preparation of polyvinyl acetal color formers.

The preparation of polyvinyl acetals by reaction of an aldehyde and polyvinyl alcohol in an aqueous medium in the presence of an acidic catalyst is well known. The aldehydes, formaldehyde, acetaldehyde, butyraldehyde, etc., commonly used are soluble in the reaction medium and do not undergo side reactions. Furthermore, the preparation of such acetals permits the removal when necessary of unreacted aldehyde without difficulty. However, higher molecular weight aldehydes and particularly those containing color-forming groups are insoluble in the common reaction media and, in addition, contain functional groups which are disadvantageous since they undergo self-condensation.

An object of this invention is to provide an improved process of preparing polyvinyl acetal color formers. Another object is to provide such a process which is free from the above disadvantages. A further object is to provide a process of preparing polyvinyl acetal color formers in increased yields and free from by-products. Still other objects will be apparent from the following description of the invention.

The above objects are attained and a commercially practical process of preparing polyvinyl acetal color formers provided by condensing a monomeric color-forming aldehyde or lower acetal thereof with a synthetic hydroxyl polymer having a plurality of recurring intralinear

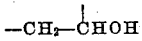

or vinyl alcohol groups in a liquid reaction medium of ethylene glycol containing an acidic condensation catalyst. The hydroxyl polymer should contain sufficient

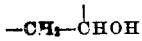

groups to render it water soluble or hydrophilic. The resulting condensation product preferably should also contain sufficient solubilizing groups to make the final product water soluble or hydrophilic. Thus, in addition to the hydroxyls of the vinyl alcohol units, the compounds may contain solubilizing acid groups, e. g., sulfonic and carboxylic acid groups and water-soluble salts of such acids. The lower acetals comprehended are those from alkanols of 1 to 4 carbon atoms and 1,2- and 1,3-alkanediols or glycols of 2 to 4 carbon atoms.

The process may be advantageously carried out as follows: A suspension of a synthetic hydroxyl polymer having a plurality of recurring intralinear

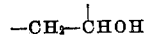

groups, e. g., polyvinyl alcohol, and a color-forming aldehyde or an acetal thereof with an alkanol of 1 to 4 carbon atoms or a 1,2- or 1,3-alkanediol of 2 to 4 carbon atoms in ethylene glycol having dissolved therein a small portion of an acidic catalyst is heated with agitation at 60°–80° C. for a period of 0.5 to 25 hours and the resulting polyvinyl acetal is isolated. Isolation of the color-forming polymeric acetal is accomplished by the addition of an ethylene glycol miscible solvent which is not a solvent for the polymeric acetal, followed by filtration and, if desired, by washing with an ethylene glycol miscible solvent which is not a solvent for the polymeric acetal.

In its preferred embodiment a suspension of 15 parts of a polyvinyl alcohol and 1 to 6 parts of color-forming aldehyde or its ethylene glycol acetal in 100 parts of ethylene glycol containing 1 to 2 parts of phosphoric acid is heated with agitation at 65°–75° C. for 0.5 to 5 hours. The reaction mixture is cooled to 40°–50° C. and 100 to 200 parts of methanol or acetone are added. The resulting polyvinyl acetal color former is separated and slurried with methanol or acetone to free the polymer of the ethylene glycol and to remove traces of unreacted monomeric color-former. In order to obtain a polyvinyl acetal whose color and solubility do not change on standing, it is desirable to treat the slurry of the polyvinyl acetal color former with a compound capable of neutralizing the acid catalyst. Suitable compounds for this process include alkoxides, alkali metal hydroxides, bicarbonates and carbonates; ammonia and its mono-, di-, and trialkyl substituted compounds, such as methylamine, dimethylamine, ethylamine, triethylamine, triethanolamine, etc.; heterocyclic bases, such as quinoline, pyridine, etc. The quantity of neutralizing agent added to the suspension should be sufficient to bring the pH to a value of about 6 to 8, preferably 7.5. The acid neutralizing compound may be dissolved in the solvent used during the dilution of the ethylene glycol reaction mixture, or may be added during any of the subsequent slurrying steps.

Other suitable acid catalysts for use in the acetalization of polyvinyl alcohol in ethylene glycol include acids, such as sulfuric acid, hydrochloric acid, and organic acids, such as chloroacetic acid, formic acid, methane sulfonic acid, para-toluenesulfonic acid, etc.

The preferred class of color-forming aldheydes and their acetals are prepared by the reduction of lower acetals of nitrobenzaldehydes to acetals of aminobenzaldehydes. These aminoacetals are condensed with amide-forming derivatives of color-forming acids to give color-forming amidobenzaldehyde acetals. If desired, these may be converted to color-forming amidobenzaldehydes by hydrolyzing in acid media. The nitrobenzaldehyde acetals used in this process can be prepared from a nitrobenzaldehyde, for example, meta-nitrobenzaldehyde, and a lower monhydric or dihydric aliphatic alcohol by various methods. The nitrobenzaldehyde acetal is reduced preferably with hydrogen and a hydrogenation catalyst under neutral or basic conditions. Thus the nitroaldehyde and alcohol together with an acid catalyst may be mixed and water removed by distillation with a water-immiscible solvent, for example, benzene, toluene, xylene, chlorobenzene, etc. Suitable catalysts are sulfuric acid, hydrochloric and phosphoric acid, etc. In case the alcohol is too low-boiling and the reaction does not go to completion rapidly, certain alkylating agents may be employed, for example, dialkyl, sulfites, alkyl orthoesters, etc. Suitable groups to use in this process are derived from such aliphatic alcohols as methyl, ethyl, propyl, and isobutyl alcohols, ethylene glycol, 1,2-propylene glycol, trimethylene glycol, etc.

Such reductions may be carried out at temperatures of 40°–150° C., although temperatures in the range of 70°–100° C. are preferred and hydrogen pressures of 1–100 atmospheres with the preferred range being 10–40 atmospheres. Suitable hydrogenation catalysts are the base or noble metal catalysts of the supported or unsupported type, e. g., alloy skeleton nickel, nickel-on-kieselguhr, reduced platinum, palladium, etc. The reduction may be carried out without a solvent, but an organic solvent is preferably employed to moderate the reaction. Suitable solvents include alcohols, e. g., methyl, ethyl and isopropyl alcohol; and hydrocarbons, for example, benzene and toluene. After reduction, the catalyst is removed by filtration and an alkali stabilizer added in the ratio of 0.005 to 0.1 mole per mole of amine. This stabilizer prevents decomposition of the aminoacetal through elimination of alcohol during storage or subsequent distillation. Suitable stabilizers include alkali metal hydroxides, carbonates, strong organic bases such as triethanolamine, tetramethylammonium hydroxide, etc. The crude reaction mixture may be concentrated to remove solvents and water formed during reduction and, if desired, distilled under low pressure, e. g., 0.1–10 mm. of mercury. The distilled aminobenzaldehyde acetals are obtained as clear, colorless, slightly viscous liquids.

In copending application Serial Number 719,110 filed December 28, 1946, now U. S. Patent 2,481,434, there are described cyclic aminobenzaldehydes of 1,2- and 1,3-glycols of 2 to 4 carbon atoms and their preparation which are useful in accordance with this invention.

The aminobenzaldehyde acetals so prepared are reacted with an amide-forming derivative of a color-former acid to form a color-forming amidobenzaldehyde acetal. By the term "color-former acid" is meant an organic carboxylic or sulfonic acid containing a color-forming nucleus capable of condensation or coupling with diazotized aromatic amines to form azo dyes and with oxidized primary aromatic amino developing agents to form quinoneimine or azomethine dyes.

Dye intermediates of the above type are well known in the dye and color photography art and usually contain as the coupling group a structure which may be represented by

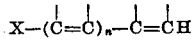

where X is HO— or RHN where R is H or an aliphatic or substituted aliphatic group thus making RHN— a primary or secondary amine group, and $n$ is zero or one. A large number of atoms or groups, for example, hydrogen, halogen, carboxylic or sulfonic acid groups and their derivatives, fused rings, alkyl, aryl, alkoxy, aryloxy, etc., may satisfy the remaining valences. The hydrogen atom in the formula may be replaced by groups readily displaced in the coupling reaction; for example, halogen atoms, carboxylic or sulfonic acid groups. This group is found in the active methylene dye intermediates and in aromatic hydroxyl and amino compounds and includes the reactive ethenol, aminoethenyl, 4-hydroxy- and 1,3-butadienyl groups. These occur in phenols, naphthols, aromatic amines, acylacetamides, beta-ketoesters, pyrazolones, homophthalimides, cyanoacetyl compounds, etc.

In preparing the color-forming amidobenzaldehyde acetals, the reaction is carried out between an amide-forming derivative of one of the dye intermediate acids and the aminobenzaldehyde acetal. By "amide-forming derivative" is meant a functional derivative of the acid that can be reacted readily with the aromatic amine to form an amide. Such derivatives include the lower alkyl esters, for example, the methyl and ethyl esters and anhydrides and acid chlorides. The amidation reaction is normally carried out under neutral or alkaline conditions since under acidic conditions the aminoacetal is unstable and condenses with itself, while in alkaline solutions the acetal group is stabilized and will not react with the amino group or with the dye intermediate molecule.

In the case of acylation with esters to form amides, the reaction is usually carried out at elevated temperatures under such conditions that the alcohol formed is continuously removed by distillation. A solvent is frequently used in the reaction to control the temperature and to assist in the removal of the alcohol formed during the reaction. The preferred solvents boil in the range of 100° to 170° C. and are free from groups reactive with esters, amines and acetals. Such solvents include toluene, xylene, chlorobenzene, etc. A basic catalyst is normally used in the reaction.

Suitable catalysts for the acylation reactions include alkali metal hydroxides and organic bases, such as pyridine, triethanolamine, etc. The products are usually recovered by crystallizing from the reaction mixture or by extracting the reaction mixture with aqueous sodium hydroxide solution followed by careful neutralization of the extract.

Acylation with an acid chloride is usually carried out in solution or suspension in the presence of an excess of a base capable of neutralizing the hydrogen chloride formed in the reaction. Suitable solvents include dioxane, acetone, diethyl ether, benzene, chloroform, etc.; or mixtures of these with water. The reaction is usually carried out at temperatures between —10° C. and +50° C. Basic reactants that may be used to neutralize the hydrogen chloride are alkali metal and alkaline earth hydroxides, bicarbonates, carbonates, etc., and organic tertiary amine bases, for example, pyridine, quinoline, triethylamine, etc.

The aldehyde group has been maintained in the form of an acetal in the above reactions to avoid (1) self-condensation of the aldehyde and amine groups and (2) the condensation of the aldehyde group and color-forming nucleus. Either of these reactions can readily lead to useless products. After the acylation reaction has been carried out, there is no danger of the first type of condensation, but the second can still occur. The second type of condensation occurs easily in alkaline solution where the color-forming nucleus is an active methylene type. Thus, when the color-former contains the groups —CO—CH₂—CO or —CO—CH₂—C=N—, etc., as found in acylacetamides and pyrazolones, a condensation may occur in alkaline solution with free aldehyde groups to give polymeric products. For this reason, color-forming acetals are preferred especially when the color-former nucleus contain active methylene groups. The preparation of color-forming derivatives of aminobenzaldehyde of the above types are described more fully in copending applications Serial Numbers 667,126 now U. S. Patent 2,464,597; 667,111 now U. S. Patent No. 2,423,572, and 667,125 now U. S. Patent 2,476,987, all filed May 3, 1946.

Acetalization, acetal hydrolysis and acetal interchange occur rapidly in acid solution but normally do not occur at all in alkaline solution. Thus, the color-forming amidobenzaldehyde-acetal may be reacted with a vinyl alcohol polymer in the presence of an acidic catalyst to yield by acetal interchange the color-forming polyvinyl acetal. It is also possible in cases where (1) the rate of condensation of the aldehyde group and active methylene group is negligible under acylation conditions; (2) the active methylene group is protected, and (3) the color-forming nucleus is not of the active methylene type, to hydrolyze the acetal to the color-forming amidobenzaldehyde before the acetalization of the vinyl alcohol polymer. This procedure is desirable when the aldehyde can be crystallized more readily than the acetal. In either case it is important that the reaction be carried out under mild conditions in the presence of catalytic amounts of an acid sufficient to lower the pH to below about 3.5.

In certain types of color-former nucleus, the undesirable aldehyde/active methylene group condensation occurs more readily and it is preferred that the methylene group be protected by acylation. Thus, in the case of the 5-pyrazolones it has been found desirable to convert the pyrazolone to a 5-acyloxypyrazole by treatment with an acylating agent, for example, acetic anhydride, acetyl chloride, benzoyl chloride, benzenesulfonyl chloride, methyl or ethyl chlorocarbonate, etc.

The synthetic hydroxyl polymers used in the preparation of color-forming polyvinyl acetals include the well-known hydroxyl polymers prepared by polymerizing a vinyl ester, for example, vinyl acetate, vinyl propionate, vinyl benzoate, etc., alone or with minor proportions, that is 10% or less, of an unsaturated copolymerizable monomer followed by partial or complete hydrolysis and if desired by further reaction to introduce minor proportions of other modifying groups, for example, acetal, ester or ether groups. Such polymers have a linear chain consisting mainly of

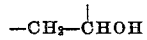

groups. Hydrophilic polymers useful in preparing the products of this invention contain this unit representing at least 50% of the monomer chain. That is, for every 100 chain atoms there are at least 25 hydroxyl groups, preferably said units representing 80% of the polymer chain; that is there are 40 or more aliphatic hydroxyl groups per 100 chain atoms.

The reaction conditions and ratio of reactants are so chosen that products having the desired degree of substitution are obtained. This degree of substitution will vary depending upon the particular use to be made of a polymer, the molecular weight of the aldehyde and the color-forming structure, but it has been found that the most useful products are those in which between 3 and 35% by weight of the polymer is represented by the color-forming acetal grouping. This compares to a substitution of between 1 and 18% of the hydroxyl groups of the polymer depending upon the molecular weight of the color-forming compound. The preferred products are those having a color-former content of 6 to 30% by weight, since they give a high color density and, at the same time, possess excellent film-forming properties.

In cases where the polyvinyl acetal color-former is to be used alone as a silver halide binding agent, it should be hydrophilic in character and have solubility permeability characteristics as defined in United States Patent 2,397,864. Thus, it should preferably be soluble in a boiling aqueous solution containing less than 50% of alcohol and the films should not dissolve in water or photographic processing solutions at 30° C. or less. However, the films should be readily permeable to processing solutions and water at temperatures in the range of 15° to 25° C. so that rapid photographic processing is possible. In cases where a lower solubility and permeability is desired, it is usually satisfactory to use a synthetic polymer of high molecular weight which gives a solution of high viscosity or to use a polymer having a lower hydroxyl content, such as a hydrolyzed interpolymer of vinyl acetate with 5-10% of ethylene. If, on the other hand, the desired substitution gives a product of too low solubility, this may be corrected by introducing solubilizing groups. The preferred method consists in the acetalization with an aldehyde containing a salt-forming group, for example, ortho-sulfo-benzaldehyde or phthalaldehydic acid. When the color-forming polymers of this invention are to be added to silver halide emulsions in other colloids, it is desirable to have the two colloids compatible. The hydroxyl polymer color-formers are completely compatible with other hydroxyl polymers, for example, polyvinyl alcohol, etc. To make them more compatible with proteins, for example, gelatin, it is necessary to introduce acidic salt-forming groups in the polymer. This may be accomplished by the use of color-forming aldeforming groups into the polymer. This may be hydes containing carboxylic or sulfonic acid groups or by coacetalization using an aldehyde containing such groups, for example, o-sulfobenzaldehyde, phthalaldehydic acid, etc.

The following examples in which parts are by weight and temperatures °C. unless otherwise stated and in which operations involving light-sensitive halides are carried out in the absence of light to which the silver halides are sensitive are intended to illustrate the procedure of this invention, but not to limit its scope.

*Example I*

To a reactor equipped with a distillation column, receiver and agitator is added 500 parts of xylene, 500 parts of meta-nitrobenzaldehyde, 225 parts of ethylene glycol and 1 part of phosphoric acid. The mixture is heated until the internal temperature is about 120° at which point distillation of xylene and water starts. When the inside temperature has reached 160° and 62 parts of water together with 312 parts of xylene has separated, heating is discontinued and vacuum applied to the receiver. The distillation is continued until the inside pressure is 50 mm. of mercury and the temperature 100°. During this distillation 214 parts of distillate is removed. The solution is poured at 100° into 700 parts of ethyl alcohol containing 2 parts of sodium carbonate in 20 parts of water. The solution is stirred 15 minutes, filtered and cooled to induce crystallization. The resulting suspension is filtered, washed with 90 parts of cold alcohol and dried to give 560 parts of nearly colorless crystalline compound melting at 56°–58°. Analysis calculated for $C_9H_9O_4N$: C, 54.5; H, 4.6; N, 7.2. Found: C, 55.5; H, 4.6; N, 7.0.

A mixture of 134 parts of this meta-nitrobenzaldehyde ethylene glycol acetal, 134 parts of methanol and 7 parts of a nickel-on-kieselguhr catalyst is charged into an autoclave heated to 65° and hydrogen admitted to increase the pressure to 300 pounds per square inch. The mixture is agitated under a pressure of 300 to 500 pounds per square inch and at a temperature of from 80°–90°. After about 2 hours no further hydrogen is absorbed and the temperature is lowered to 40°. The mixture is freed from catalyst by filtration and mixed with 1.4 parts of 30% sodium hydroxide solution to stabilize the amino acetal against self-condensation. The solution is distilled until the internal temperature reaches 100°, then vacuum is applied and distillation continued at a pressure of 5 mm. The product boiling at 145°–155° is collected and amounts to 100 parts which corresponds to a 90% yield. The clear, colorless, viscous liquid can be fractionated to a product of 100% purity having the following properties: $N_D^{25}=1.578$;

$$D_{25}^{25}=1.199$$

$M_D=45.75$; B. P. 138° at 1.0 mm.; 145° at 2 mm.; 158.5° at 6 mm.

A mixture of 15.9 parts of meta-benzoylacetamido-benzaldehyde ethylene glycol acetal (prepared as described in Example I in McQueen United States application Serial Number 667,126 filed May 3, 1946), 5.7 ortho-sulfobenzaldehyde (sodium salt), 500 parts of ethylene glycol, 7.5 parts of 95% phosphoric acid and 75 parts of a finely divided polyvinyl alcohol (completely hydrolyzed and having a 4% aqueous solution viscosity of 18–24 centipoises at 20° C.) is heated with stirring at 66° for 45 minutes. The reaction mixture is cooled to 60° and 400 parts of methanol is added with stirring. The solid precipitated is then collected on a filter and washed thoroughly with methanol and then with acetone. The yield of polyvinyl acetal is 89 parts. The polymer is colorless and dissolves readily to give homogeneous solutions of good viscosity.

It is dissolved in aqueous ethanol by warming and may be used in photographic emulsions as described in United States Patents 2,310,943 and 2,397,864. Thus, a solution is prepared by stirring at 50° for one hour 10 parts of this polymer, 40 parts of ethanol and 150 parts of water. To one-half of this solution is added 31 parts of 3 N ammonium hydroxide and 2 parts of 0.5 N potassium iodide. The mixture is stirred at 40° while adding a solution of 29 parts of 3 N silver nitrate, 50 parts of water and 17 parts of 28% ammonium hydroxide during one minute. After stirring for ½ hour, 150 parts of 15% sodium sulfate solution is added. The precipitated silver halide emulsion is washed for one hour in running water and drained. The remainder of the polymer solution is added and the mixture stirred at 65° for one-half hour. After cooling to 25° the emulsion is coated on baryta-sized white paper and cellulose acetate film base. Proportions of these elements are exposed to form latent images and developed in a solution composed of the following ingredients:

|  | parts |
|---|---|
| p-Aminodiethylaniline hydrochloride | 2 |
| Sodium sulfite (anhydrous) | 10 |
| Sodium carbonate (monohydrate) | 20 |
| Potassium bromide | 2 |
| Water | 1,000 |

The elements are then washed, bleached in 4% potassium ferricyanide, fixed in 25% sodium thiosulfate, and washed. The resulting paper and film contain bright, strong, yellow dye images corresponding to the latent images.

*Example II*

A stirred mixture of 22,000 parts of ethylene glycol and 375 parts of 95% phosphoric acid is heated to 69° in a jacketed reaction vessel and a mixture of 3,000 parts of polyvinyl alcohol of the type used in Example I, 600 parts of 3-[4-(5-ethylcarbonato - 3 - methyl - 1 - pyrazolyl) benzamido] benzaldehyde ethylene glycol acetal (prepared as described in Example I of Martin United States application Serial Number 667,125 filed May 3, 1946, now U. S. Patent 2,476,987) (or 540 parts of the free aldehyde prepared as described in Example I of aforesaid Martin application) and 200 parts of ortho-sulfobenzaldehyde sodium salt monohydrate is added rapidly (within one minute) and the resulting mixture is stirred at 64°–5° for thirty minutes. The mixture is cooled to 45°–50° during the course of fifteen minutes and a solution of 290 parts of triethylamine in 10,000 parts of methanol is added. The reaction mixture is stirred for two or three minutes and discharged from the reactor into 10,000 parts of methanol. The polyvinyl acetal is filtered and the product slurried with three changes of methanol of 15,000 parts each to give 3,340 parts of magenta color-forming polyvinyl acetal. This material contains 18% by weight of color-former and a 5% solution in 12% ethanol may be prepared by stirring at 80° for 45 minutes. The resulting solution is clear and colorless and may be used as described above for the preparation of an emulsion. An emulsion prepared from this product is of high quality. It coats well on baryta-sized paper and cellulose acetate film base and produces after exposure and development, as described in Example I, brilliant magenta dye images.

*Example III*

A solution of 17.6 parts of m-(1-acetoxy-2-naphthalenesulfonamido)benzaldehyde (prepared as described in Example I of United States application Serial Number 667,111 filed May 3, 1946, now U. S. Patent No. 2,423,572) in a mixture of 55 parts of ethylene glycol and 7 parts 85% phosphoric acid is prepared by stirring at 90° for fifteen minutes and to the filtered solution is added 55 parts of ethylene glycol and 7 parts of 85% phosphoric acid. The resulting solution is heated to 75° and 100 parts of polyvinyl alcohol of the type used in Example I is added rapidly. After stirring at 75° for one hour the reaction mixture is cooled to 50° and is diluted with 800 parts of acetone. The polyvinyl acetal is filtered and washed by stirring with 800 parts of acetone for one-half hour. This process is repeated three times and the acetal is dried at 50°–55° for eight hours. The polymer is essentially colorless and gives clear, homogeneous solutions. This product, when used in place of the product of Example I, produces light-fast, blue-green dye images.

Example IV

To a stirred solution of two parts 95% phosphoric acid in 100 parts of ethylene glycol heated to 69° is added a mixture of 25 parts of polyvinyl alcohol of the type used in Example I, 1.7 parts of o-sulfobenzaldehyde sodium salt monohydrate and 5 parts of 3-[4-(5-ethylcarbonato-3-phenyl-1-pyrazolyl) benzamido]benzaldehyde (prepared as described in Example IV of the aforesaid Martin application now U. S. Patent 2,476,987) rapidly and the suspension is stirred at 65° for fifty minutes. After cooling to 60°, 200 parts of methanol containing 1.6 parts of triethylamine is added and the polyvinyl acetal is collected. After freeing of ethylene glycol by slurrying with two changes of 200 parts each of methanol, there is obtained 28 parts of polyvinyl acetal which is readily soluble in 20% ethanol. This polymer when used in place of the product in Example I produces purplish magenta images.

Example V

To a stirred solution of 1.8 parts of 95% phosphoric acid in 150 parts of ethylene glycol heated to 69° is added rapidly a mixture of 20 parts of polyvinyl alcohol of the type used in Example I, 2.5 parts of o-sulfobenzaldehyde sodium salt monohydrate, 4 parts of 3-[4-(5-ethylcarbonato-1-phenyl - 3-pyrazolyl) benzamido]benzaldehyde (prepared as described in Example IV of the aforesaid Martin application now U. S. Patent 2,-476,987) and the suspension is stirred at 64° for 50 minutes. After cooling to 50°, the mixture is diluted with 200 parts of methanol containing 1.5 parts of triethylamine. The polyvinyl acetal is collected and freed of ethylene glycol and traces of unreacted monomer as described in Example IV. This polyvinyl acetal, when used in place of the product in Example I, produces a purplish magenta image very similar to the image obtained in Example IV.

Example VI

A solution of 2 parts of m-[p-(5-ethylcarbonato-1-(4-chlorophenyl) - 3-pyrazolyl)benzamido] benzaldehyde (prepared as described in Martin United States application Serial Number 682,137, filed July 8, 1946, now U. S. Patent 2,476,988) in 100 parts of ethylene glycol is obtained at 150°. The solution is cooled to 100° and 1.5 parts of 95% phosphoric acid is added. The resulting solution is cooled at 75° and a mixture of 10 parts of polyvinyl alcohol and 1.5 parts of o-sulfobenzaldehyde sodium salt monohydrate is added rapidly. The resulting suspension is stirred at 73°–74° for thirty minutes. The mixture is cooled to 65° and 250 parts of methanol containing one part of triethylamine is added. The product is collected and freed of ethylene glycol as described in Example IV. This material, when used in place of the product of Example I, yields a purplish magenta image.

Example VII

Following the general procedure outlined in Example VI, 3-[4-(5-ethylcarbonato-1-methyl-3-pyrazolyl)benzamido] benzaldehyde (prepared as described in Example I of Martin United States application Serial Number 667,125 filed May 3, 1946, now U. S. Patent 2,476,987) gives a high-quality polyvinyl acetal which, when used in place of the product of Example I, produces purplish magenta images.

Example VIII

A mixture of 47 parts of 1-hydroxy-2-naphthoic acid and 80 parts of thionyl chloride is refluxed gently for thirty minutes. The excess thionyl chloride is removed under reduced pressure and the solid residue is dissolved in 100 parts of dioxane. The dioxane solution is distilled under reduced pressure for a few minutes to insure the removal of the excess thionyl chloride. A mixture of 35 parts of anhydrous potassium hydroxide, 30 parts of water, 150 parts of dioxane and 40 parts of m-aminobenzaldehyde ethylene glycol acetal (see Example I), is stirred at 10° and the dioxane solution of the acid chloride is added dropwise at this temperature. Stirring is continued at 10° for one hour after the addition of the acid chloride is complete, then for two hours at 25°. The reaction mixture, which contains a finely-divided white solid, is filtered and the insoluble material is washed with dioxane. The combined filtrates and washings are stirred and diluted with 1,000 to 2,000 parts of water and the stirring continued until the product has solidified. The yield of crude product obtained by filtration is 55 parts which melts at 125°–130°. Crystallization from a chloroform-acetone mixture yields 35 parts of pure 3-(1-hydroxy-2-naphthamido)benzaldehyde ethylene glycol acetal which melts at 145°–146°.

A mixture of 1,300 parts of ethylene glycol and 30 parts of 85% phosphoric acid is stirred at 25° and 200 parts of polyvinyl alcohol is added. To this slurry is added a solution of 12 parts of o-sulfobenzaldehyde sodium salt monohydrate in 55 parts of ethylene glycol and a solution of 32 parts of 3-(1-hydroxy - 2-naphthamido)benzaldehyde ethylene glycol acetal in 100 parts of acetone. The mixture is stirred at 25° for thirty to fifty minutes, then is placed in 65° constant temperature water-bath and stirred for one hour after the internal temperature reaches 60°. The colorless, soluble polyvinyl acetal is isolated by filtration after dilution with 1000–1500 parts of acetone. The filter cake is slurried twice with 1000 parts of methanol and twice with 1000 parts of acetone to yield 225 parts of polyvinyl acetal. This material contains 15% by weight of color-former. This polymer, when used in place of the product in Example I, produces bright, light-fast, blue-green images.

Example IX

A solution of 7.5 parts of 95% phosphoric acid in 550 parts of each of the reaction media listed in the following table is heated to 69°–70° and a mixture of 75 parts of polyvinyl alcohol of the type used in Example I, 15 parts of 3-[4-(5-ethylcarbonato - 3 - methyl - 1 - pyrazolyl)benzamido]benzaldehyde ethylene glycol acetal (prepared as described in Example I of Martin United States application Serial Number 667,125 filed May 3, 1946, now U. S. Patent 2,476,987) and 5 parts of o-sulfobenzaldehyde sodium salt monohydrate is added rapidly. The resulting suspension is slurried at 64°–65° for forty-five minutes, cooled to 45° and 500 parts of methanol containing 8 parts of triethylamine is added. The polyvinyl acetal is isolated, freed of reaction media and unreacted color-forming acetal as described in Example II and the color-former content of the polyvinyl acetal is determined. The results are summarized in the following table.

| Reaction Medium | Per Cent Color-Former |
|---|---|
| Ethylene glycol | 18.0 |
| 1,2-propylene glycol | 2.7 |
| 2,3-butylene glycol | 0.2 |
| Diethylene glycol | 1.8 |
| Trimethylene glycol | 0.2 |
| Glycerol | 1.7 |
| Dioxane | 0.2 |
| Acetone [1] | <0.1 |

[1] Run at reflux temperature of acetone (56°).

Ethylene glycol is a unique and decidedly advantageous reaction medium for the acetalization of polyvinyl alcohol with color-forming aldehydes and their acetals as established by the examples. Its use leads to unexpectedly high yields and constitutes an important advance in the art. With ethylene glycol, acetalization of polyvinyl alcohol with the color-forming aldehydes and their acetals goes to completion, i. e., essentially all of the monomeric color-former undergoes acetal interchange with polyvinyl alcohol to give a polymeric acetal under mild conditions, thereby permitting a control of the amount of color-former introduced into the polyvinyl acetal by simply controlling the ratio of the reactants. It is surprising that acetalization of the polymer should go so completely when the polymer is in another phase and the solvent competes with the polymer for aldehyde groups. Using ethylene glycol as the reaction medium, the approximate per cent color-former by weight in the final polyvinyl acetal can be calculated from the equation $$\frac{\text{Wt. of monomeric color-former}}{\text{Wt. of polyvinyl alcohol} + \text{Wt. of monomeric color-former}} \times 100 = \text{Per cent color-former in polyvinyl acetal}$$

wherein the monomeric color-former is either the aldehyde or its ethylene glycol acetal.

The ratio of ethylene glycol to synthetic hydroxyl polymer, e. g., polyvinyl alcohol, may be varied within rather wide limits but for most purposes the ratio is governed by the viscosity of the reaction mixture, normally only enough being used to make it possible to stir the mixture. The preferred mixture is 1 part polyvinyl alcohol or other hydroxyl polymer suspended in 6 to 10 parts of ethylene glycol. Ratios of 1 part of polyvinyl alcohol, etc., to 3 to 40 parts of ethylene glycol are also operable. The amount of color-forming aldehyde or acetal is selected on the basis of the amount of substitution desired and is normally from 0.06 to 0.4 part per part polyvinyl alcohol or other hydroxyl polymers.

The reaction temperature may be varied between 40° C. and 100° C., the preferred range being 60° to 80° C. At temperatures above 100° C. the hydroxyl polymer, e. g., polyvinyl alcohol, becomes soluble in the ethylene glycol, thereby making the isolation of the resulting polymeric color-forming acetal more difficult.

It is also possible to use minor amounts of other liquid diluents or solvents with ethylene glycol for the acetalization reaction. Such compounds include water; ketones, e. g., acetone, methyl ethyl ketone; alcohols, e. g., methanol and ethanol; ethers, e. g. diethyl ether, dioxane; esters, e. g., ethyl acetate. It is preferable that such compounds be miscible with ethylene glycol.

The polymeric color-forming acetals may be isolated from the reaction medium in a number of ways. The reaction mixture may be diluted with a solvent which is miscible with the reaction medium and which is a non-solvent for the polymeric color-forming acetal in order to insure the complete separation of such acetal from the reaction media. Such compounds include ketones, e. g., acetone; alcohols, e. g., methanol and ethanol; ethers, e. g., dioxane, ethylene glycol dimethyl ether, etc.; esters, e. g., ethyl acetate, etc.

Different color-forming groups have different effects on the polymeric products such as viscosity, solubility and permeability. It is desirable to have methods for controlling the physical properties of the product. This can be accomplished by the following methods.

To decrease the solubility of the product a higher viscosity polyvinyl alcohol, for instance, may be used. However, a preferred method for decreasing the solubility of the final product is by use of a hydrolyzed interpolymer of vinyl acetate with 5% or less of an unsaturated compound taken from the class of terminally unsaturated mono-olefins of four or less carbon atoms. In addition, a decrease of solubility can be obtained by introducing into the polymer prior to, during, or subsequent to the color-former condensation such groups as (1) acetate groups; (2) butyrate or benzoate groups; and (3) acetal groups, for example, butyral or benzal groups.

To increase the solubility of the final product a polyvinyl alcohol of lower viscosity, for instance, may be used. Likewise an increase in solubility can be obtained when the following constituents are present in the final product by reaction with a portion of the hydroxyl groups: (1) phthalaldehydic acid, glyoxylic acid or benzaldehyde sulfonic acids and their alkali metal salts; (2) half-esters of dibasic acid, for example, phthalic, succinic acid, etc.; and (3) hydroxyether groups.

In addition to the color-forming aldehydes and acetals of the above examples, many of the other well known color-formers may be employed. Thus, the color-forming nucleus may be a phenol or naphthol having a coupling position available ortho, para to the aromatic hydroxyl or an active methylene compound; that is, a compound having a —CH$_2$— group activated by conjugated groups taken from the class $$-\overset{|}{C}=O, \quad -\overset{|}{C}=N, \quad -NO_2, \quad -\overset{|}{C}=N-, \quad -\overset{|}{S}O_2$$

—CONH—, —COOalkyl, —COOaryl, connected directly or through a conjugated system. Such active methylene compounds are distinguished by their ability to have one of the hydrogen atoms of the methylene groups replaced by alkali metal in aqueous solution and include many cyclic and heterocyclic compounds described in the literature. Examples of such coupling compounds, in addition to those mentioned above, include (1) pyrazolones, (2) beta-ketoacylamides, (3) N-homophthalylamines, (4) indoxyl and thioindoxyl, (5) para-nitrobenzyl cyanide, (6) malonamides, (7) phenacyl pyridinium chloride, (8) hydroxypyridines, and (9) cyanoacetanilides.

As mentioned above, the use of ethylene glycol has the outstanding advantages of causing the acetalization reaction (1) to proceed to completion, (2) to yield uniform soluble products, (3) to facilitate the isolation of the reaction product from the heterogeneous reaction mixture, and (4) some color-forming aldehyde and acetals are soluble in ethylene glycol but insoluble in solvents for polyvinyl alcohol, such as, water and water-alcohol mixture. The hydrophilic hydroxyl polymer color-forming acetals so produced have exceptionally good color, are uniformly soluble, and can be utilized to form superior photographic emulsions. The very high standards of quality necessary for use in photographic films is thus achieved in a novel and unexpected manner. It is surprising that ethylene glycol should behave so much differently from other solvents in these respects. It should also be noted that the reaction occurs normally between the color-forming aldehyde or acetal and a suspension of polyvinyl alcohol, conditions usually unfavorable to the formation of a uniform product and to the completeness of the reaction.

What is claimed is:

1. The process of making a polymeric color-former which comprises condensing a color-former taken from the group consisting of monomeric color-former aldehydes and acetals thereof with alkanols of 1 to 4 carbon atoms and 1,2- and 1,3-alkanediols of 2 to 4 carbon atoms, said aldehydes and acetals containing a color-former nucleus possessing a structure of the formula:

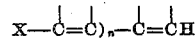

where X is a member of the group consisting of HO— and primary and secondary amine radicals, with a synthetic hydroxyl polymer of high molecular weight having a plurality of recurring intro-linear

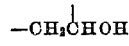

groups as polymer forming units, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, there being 3 to 40 parts of ethylene glycol per part of hydroxyl polymer.

2. The process as set forth in claim 1 wherein the acidic catalyst is phosphoric acid.

3. The process as set forth in claim 1 wherein the acidic catalyst is methane sulfonic acid.

4. The process as set forth in claim 1 wherein the acidic catalyst is para-toluene sulfonic acid.

5. The process of making a polymeric color-former which comprises condensing a color-former taken from the group consisting of monomeric color-former aldehydes and acetals thereof with alkanols of 1 to 4 carbon atoms and 1,2- and 1,3-alkanediols of 2 to 4 carbon atoms, said aldehydes and acetals containing a color-former nucleus possessing a structure of the formula:

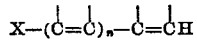

where X is a member of the group consisting of HO— and primary and secondary amine radicals, with a completely hydrolyzed polyvinyl alcohol of high molecular weight, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, there being 3 to 40 parts of ethylene glycol per part of polyvinyl alcohol.

6. The process of making a polymeric color-former which comprises condensing a color-former taken from the group consisting of monomeric color-former aldehydes and acetals thereof with alkanols of 1 to 4 carbon atoms and 1,2- and 1,3-alkanediols of 2 to 4 carbon atoms, said aldehydes and acetals containing a color-former nucleus possessing a structure of the formula:

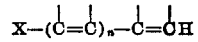

where X is a member of the group consisting of HO— and primary and secondary amine radicals, with a synthetic hydroxyl polymer of high molecular weight having a plurality of recurring intralinear

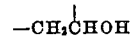

groups as polymer forming units, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, adding a solvent which is miscible with ethylene glycol but is a non-solvent for the polymeric acetal that forms and neutralizing the acid catalyst, there being 3 to 40 parts of ethylene glycol per part of hydroxyl polymer.

7. The process of making a polymeric color-former which comprises condensing a color-former taken from the group consisting of monomeric color-former aldehydes and acetals thereof with alkanols of 1 to 4 carbon atoms and 1,2- and 1,3-alkanediols of 2 to 4 carbon atoms, said aldehydes and acetals containing a color-former nucleus possessing a structure of the formula:

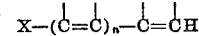

where X is a member of the group consisting of HO— and primary and secondary amine radicals, with a synthetic hydroxyl polymer of high molecular weight having a plurality of recurring intralinear

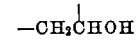

groups as polymer forming units, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, adding acetone and a neutralizing agent and recovering the polyvinyl acetal color-former, there being 3 to 40 parts of ethylene glycol per part of hydroxyl polymer.

8. The process of making a polyvinyl acetal color-former which comprises condensing a mixture of m-benzoylacetamidobenzaldehyde ethylene glycol acetal and sodium-o-sulfobenzaldehyde with a polyvinyl alcohol of high molecular weight, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, there being 3 to 40 parts of ethylene glycol per part of polyvinyl alcohol.

9. The process of making a polyvinyl acetal color-former which comprises condensing a mixture of 3-[14-(5-ethylcarbonato-3-methyl-1-pyrazolyl)benzamido-]benzaldehyde ethylene glycol acetal and sodium-o-sulfobenzaldehyde with a polyvinyl alcohol of high molecular weight, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, there being 3 to 40 parts of ethylene glycol per part of polyvinyl alcohol.

10. The process of making a polyvinyl acetal color-former which comprises condensing a mixture of m-(1-acetoxy-2-naphthalenesulfonamido) benzaldehyde and sodium-o-sulfobenzaldehyde with a polyvinyl alcohol of high molecular weight, there being at least 40 aliphatic hydroxyl groups per 100 chain atoms, in an ethylene glycol reaction medium in the presence of an acidic catalyst at a temperature of 40° to 100° C. for a period of 0.5 to 25.0 hours, there being 3 to 40 parts of ethylene glycol per part of polyvinyl alcohol.

ELMORE LOUIS MARTIN.

REFERENCES CITED

The following references are of record in the file of this patent:

UNITED STATES PATENTS

| Number | Name | Date |
|---|---|---|
| 2,037,049 | Sager | Apr. 14, 1936 |
| 2,129,450 | Talbot | Sept. 6, 1938 |
| 2,269,217 | McNally | Jan. 6, 1942 |
| 2,332,896 | D'Alelio | Oct. 26, 1943 |
| 2,380,032 | Dorough | July 10, 1945 |
| 2,399,401 | Sonnicksen | Apr. 30, 1946 |

FOREIGN PATENTS

| Number | Country | Date |
|---|---|---|
| 873,366 | France | Mar. 16, 1942 |